(No Model.) 2 Sheets—Sheet 1.
R. L. HASSELL.
CONVEYER.
No. 513,785. Patented Jan. 30, 1894.
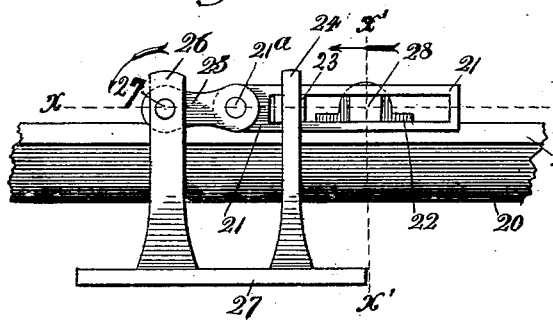
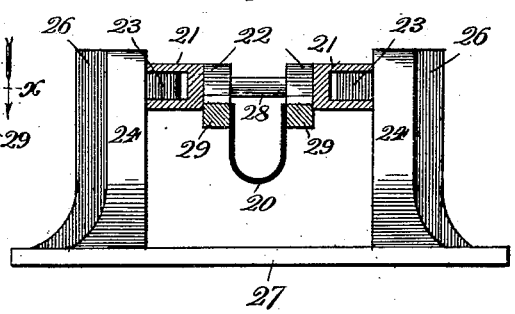
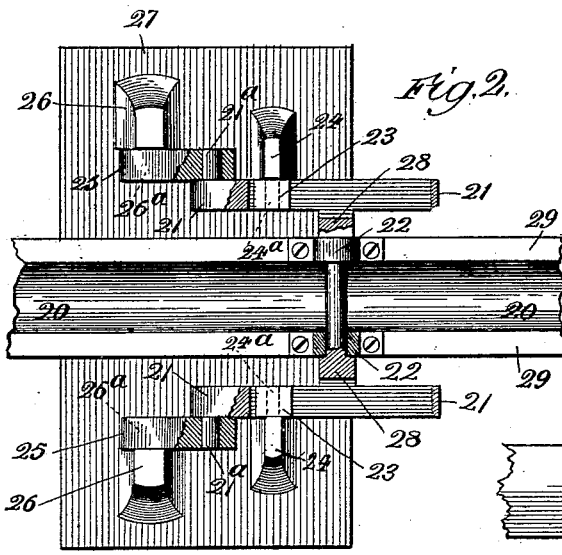
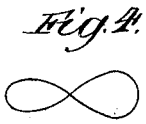
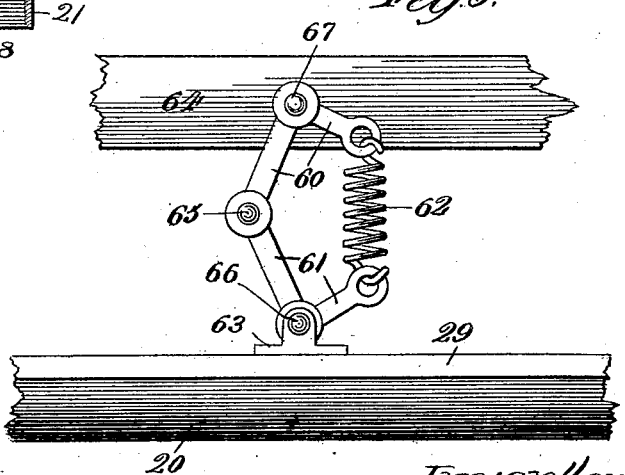
Witnesses:
Chas. E. Gaylord,
C. R. Shipley.
Inventor:
R. L. Hassell.
THE NATIONAL LITHOGRAPHING COMPANY,
WASHINGTON, D. C.

(No Model.) 2 Sheets—Sheet 2.
R. L. HASSELL.
CONVEYER.
No. 513,785. Patented Jan. 30, 1894.
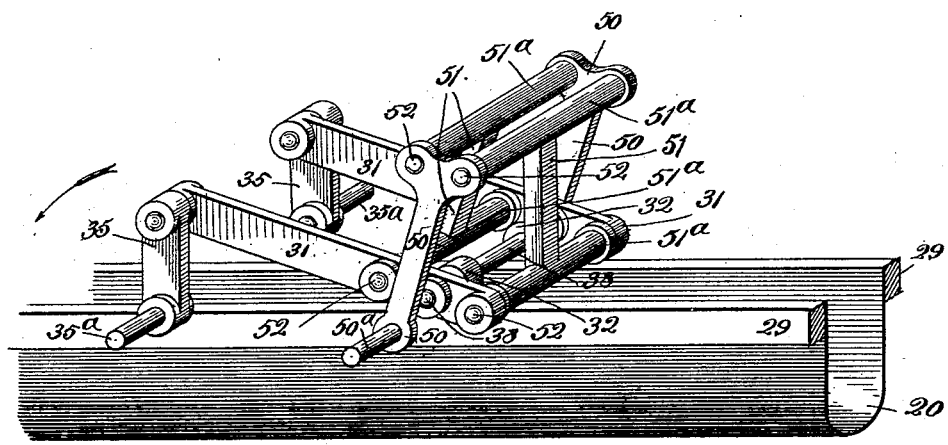
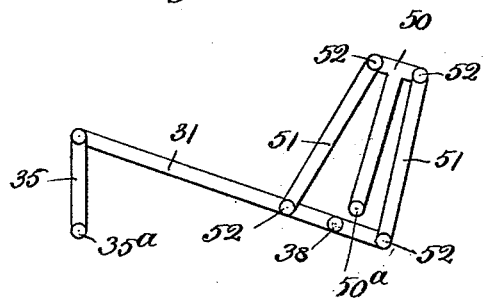
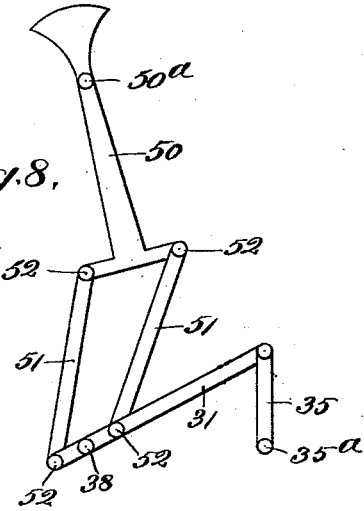
Witnesses:
Inventor
R. L. Hassell.

UNITED STATES PATENT OFFICE.

RICHARD L. HASSELL, OF CHICAGO, ILLINOIS.

CONVEYER.

SPECIFICATION forming part of Letters Patent No. 513,785, dated January 30, 1894.

Application filed April 7, 1893. Serial No. 469,477. (No model.)

*To all whom it may concern:*

Be it known that I, RICHARD L. HASSELL, a citizen of the United States, residing at Chicago, in the county of Cook and State of Illinois, have invented certain new and useful Improvements in Conveyers, which are fully described and represented in the following specification and the accompanying drawings, forming a part of the same.

My present invention relates to improvements in reciprocating conveyers such as shown in my patent of July 26, 1892, No. 479,742.

In the accompanying drawings, Figure 1, is a side view of the conveyer trough showing my improved bearing; Fig. 2, a horizontal section taken at the line $x, x$; Fig. 3, a vertical cross section taken at the line $x', x'$; Fig. 4, a curve showing path of conveyer; Fig. 5, a side view showing intermediate support, and Figs. 6, 7 and 8 views of modifications.

The object of my present invention is to provide an improved form of main bearing for giving the conveyer trough a curved motion at the end of its forward stroke, and also to provide an intermediate support of simple and inexpensive form to be used in addition to and midway between the main bearings of a conveyer trough where the distance between the main bearings is such that the trough would have a tendency to sag. The driving mechanism is not shown in the drawings. The conveyer trough may be driven by an ordinary crank with a short pitman, or by the driving mechanism described in my patent of March 21, 1893, No. 493,772, or by any form of driving mechanism that will move the conveyer with an increasing speed toward the end of the forward stroke and a decreasing speed on the return.

I will first describe my improved form of main bearing.

The conveyer trough is attached to the longitudinally moving bars 21 by means of the bearings 22 and the shaft 28. I prefer to have this shaft 28 rigid with the longitudinally moving bars 21, and free to turn in the bearings 22, which are fastened to the top of the conveyer trough. The slotted bars 21 slide longitudinally on the bearing blocks 23, which are fitted free to turn on the pins $24^a$ projecting from the inside face of the uprights 24. It will be seen that the bearing block 23 forms the fulcrum for the sliding bar 21. A wheel, or roller, may be substituted for the block. The arms 25 revolve around the centers $26^a$, and at these points are provided with projecting pins 27 which revolve in suitable bearings in the uprights 26. These revolving arms are also provided with projecting pins $21^a$ by means of which the arms are connected to the slotted bars 21.

As shown in the drawings the conveyer trough is supposed to be at the extreme end of the stroke to the right. By referring to Figs. 1 and 2 it will be seen that in this position the shaft 28—which supports the conveyer trough and is fastened to the sliding bar 21—is to the right of the fulcrum 23; consequently the weight of the trough pulls the right hand end of the slotted bar downward and raises the left hand end, thus overcoming the dead center of the revolving arm, 25. As the conveyer trough moves on its forward stroke to the left, or discharge end of the conveyer, the shaft 28 passes to the left of the fulcrum 23, and when the extreme end of the forward stroke is reached, the weight of the trough on the slotted bar 21 pulls the end of the arm 25 downward and overcomes the opposite dead center. By this arrangement the conveyer trough moves in a curve at the end of its forward stroke, and its entire path is similar to the curve shown in Fig. 4. It will be understood that considerable variation of this path may be obtained by varying the length of the revolving arm 25, and changing the point of connection of the shaft 28 on the longitudinally moving bar 21.

By moving the fulcrum farther to the right than shown in the drawings, the conveyer may be made to describe a larger curve at the end of its forward stroke than at the end of its return. A modification of this device is shown in Fig. 6. In this arrangement the function of the slot in the bar 21 is performed by the swinging bars 50 and 51. The shaft $35^a$, which is fastened to the revolving arm 35, revolves in a bearing not shown in the drawings. The longitudinally moving bar 31, is connected at one end with this revolving arm, and near the opposite end is connected with the conveyer trough by means of the bearings 32 and the shaft 38. I prefer to have this shaft 38 rigid with the bars 31, and free to turn in the bearings 32 which are fastened to the top of the conveyer trough. The projecting shaft 50ª rests in a bearing (not shown) and is fastened to the swinging bar 50; the upper end of the bar 50 is connected to the longitudinally moving bar 31 by means of the two swinging arms 51; each of these arms 51 consists, preferably, of an upper and lower horizontal bar 51ª, these two horizontal bars being rigidly connected to the vertical bar 51. These swinging arms 51 are connected to the oscillating bar 50 and the longitudinally moving bar 31 by means of the shafts 52, as shown. The shafts 52 may be rigidly connected to the bars 50 and 31 and free to turn in the horizontal bars 51ª; or these shafts may be rigidly connected to the horizontal bars 51ª, and their projecting ends free to turn in the bars 31 and 50. If desired, the horizontal bars 51ª may be dispensed with and the points 52 connected by vertical bars similar to 51 as shown in Fig. 7. The action of this device will be, perhaps, more readily understood by reference to the diagram in Fig. 7. The conveyer trough is connected at the point 38 with the longitudinally moving bar 31; as the trough travels on its stroke to the left the swinging arms 51 and the bar 50 swing to the left, the bar 50 oscillating about the fixed point, or supporting fulcrum, 50ª; on the return stroke to the right the arms 51 and bar 50 swing to the right. The location of the connecting points is such, that at the end of the stroke to the left the point 38 is to the left of the fixed point, or supporting fulcrum, 50ª, and at the end of the stroke to the right the point 38 is to the right of the point 50ª. With this device the conveyer trough will travel in a path similar to the curve shown in Fig. 4. With regard to the relative lengths of the connecting bars: if the arms 51 and bar 50 are made of equal length and about twice the length of the arm 35 the arrangement will be found to work well, but this proportion is not essential and can be varied considerably. The radius of the curves at the end of the stroke can be varied as desired by changing the relative lengths of the revolving arm, 35, and the longitudinally moving bar 31 from its point of connection with the revolving arm to its point of connection with the conveyer trough; and the conveyer trough may be made to describe a larger or smaller curve at one end of the stroke than the other, by moving the point 38 nearer to either of the points 52 on the bar 31; and the device will also work if the conveyer trough is attached to either of the arms 51, either above the bar 31, or below the bar 31, (if the ends of the arms 51 are extended below the bar 31.)

If desired, the entire arrangement of jointed bars may be placed below the conveyer trough; let the device shown in Fig. 6 be turned upside down, the lower part of the conveyer trough be closed, and the upper part be open, and the device will work; in this case however the arm 35 will revolve in the opposite direction to that shown in Fig. 6.

The arrangement and location of the jointed bars and connecting points may be as shown in Fig. 8. With this arrangement the conveyer trough will move in a much smaller curve at each end of the stroke, than if the same length bars were arranged as in Fig. 7.

Where, for any reason, the distance between the main bearings of the conveyer trough is such that the trough would have a tendency to sag, I propose to use an intermediate support in addition to the main bearings. This intermediate support is shown in Fig. 5, and consists in two arms, 60 and 61, which may be of equal length as shown, or may be unequal. These arms are jointed together at 65. The lower arm 61 is connected to the upper part of the conveyer trough by means of bearings 63; the upper arm 60 is connected to a timber or any suitable support. The connections of the upper and lower arms are such as to enable them to swing or oscillate about the points 66, 67. These arms are formed with projections, as shown, which are connected by the spiral spring 62; the action of this spring on the arms is such, that the joint at 65 has a constant pressure to the left.

The trough has the greatest tendency to sag at the instant that it reaches the lowest part of the curve at the left—or the curve nearest to the discharge end of the conveyer,—the intermediate support is so placed that at this instant the points 67, 65 and 66, are in a straight line; as the trough moves to the right on its backward stroke, and the point 66 and lower joint of the arm 61 are carried backward and upward with it, the arms bend at the joint 65 and adjust themselves to the movement of the trough. It will be seen, therefore, that at the instant the conveyer trough has the greatest tendency to sag, the weight of the trough is taken by the jointed arms 60 and 61; at other points in its travel the trough is partly supported by the spring 62 and the jointed arms. It will also be seen that the tension given to the spring at any point in the travel of the conveyer, assists the movement of the conveyer at other points in its travel, and relieves the main bearings of some of the weight of the trough.

I claim—

1. In the bearing of a reciprocating conveyer, in combination, a revolving arm, a longitudinally moving bar connected with said arm, a fulcrum for said bar, suitable supports for said fulcrum and revolving arm, and a reciprocating conveyer trough connected to the moving bar, the point of connection being so placed as to be on one side of the fulcrum at the end of the forward stroke of the conveyer, and on the opposite side of the fulcrum at the end of the return stroke, substantially as described.

2. In the bearing of a reciprocating conveyer, in combination, a revolving arm, a longitudinally moving bar connected at one end to said arm and at the opposite end to the conveyer trough, and a swinging support, said swinging support acting as a fulcrum or fulcrums whereby the weight of the trough overcomes the dead centers of the revolving arm, substantially as described.

3. The combination, of the revolving arm 35, the longitudinally moving bar 31, the swinging supports 50 and 51, and the conveyer trough, as and for the purpose specified.

4. The combination, with a reciprocating conveyer trough, of the jointed arms 60 and 61 pivoted respectively to a suitable support and the conveyer trough, and the spring 62, for the purpose specified.

RICHARD L. HASSELL.

Witnesses:
E. C. HAMBURGHER,
H. C. W. LAUBENHEIMER.